Sept. 8, 1964          J. P. TEXIER          3,147,525

TWO-PIECE MOLDING FASTENER

Filed Oct. 9, 1962

Inventor:
Jean Pierre Texier,
by Gordon Needleman
Atty.

United States Patent Office 3,147,525
Patented Sept. 8, 1964

3,147,525
TWO-PIECE MOLDING FASTENER
Jean Pierre Texier, Neuilly-sur-Seine, France, assignor to Gobin Daude, Paris, France, a firm
Filed Oct. 9, 1962, Ser. No. 229,360
Claims priority, application France, Dec. 23, 1961, 882,976, Patent 1,340,169
3 Claims. (Cl. 24—73)

This invention relates generally to fastening devices and more specifically to an automatic pin fastener.

An object of this invention is to provide a fastening pin for engaging two or more apertured supports.

Another object of the invention is to provide a fastening pin having a core for forming two or more external flanges in a flexible sheath.

Other objects of the invention will, in part, be obvious and will, in part, appear hereinafter.

Figure 1:
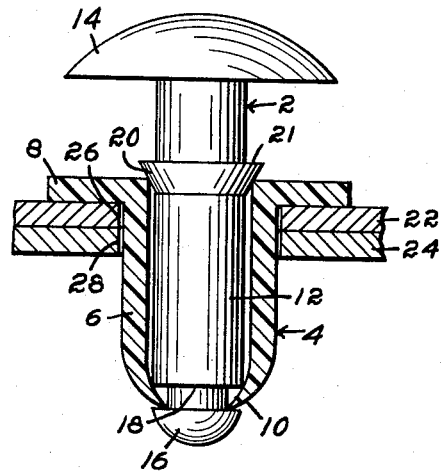
FIG. 1 is a cross section of the pin and the sheath and a pair of apertured supports with the pin partially engaged and shown in full side elevation.
Figure 2:
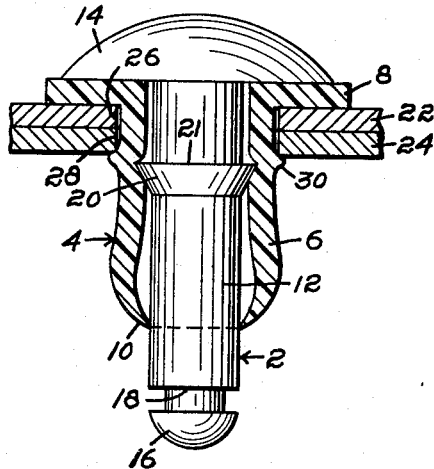
FIG. 2 is similar to FIG. 1 showing the pin fully engaged within the sheath.

In FIGS. 1 and 2 of the drawing there is shown a rivet assembly comprising a pin 2 and a sheath 4. The sheath 4, preferably made of an elastically deformable material and in the illustrated embodiment of plastic, is provided with a hollow tubular body element 6 open at both ends and having at one end an integral collar 8 extending therefrom in right angle relation thereto, whose diameter is greater than the external diameter of the body element 6. The other end of the body element 6 from the collar 8 is thinned slightly and is bent in such a way as to create an opening of smaller diameter than the remaining internal diameter of the body element 6 as shown in FIG. 1. This thinned and constricted wall adjacent to the opening remote from the collar 8 will be referred to for convenience as the restricted end 10.

The pin 2 comprises a cylindrical core element 12 having a hemispherical head 14 of larger diameter than the core element 12 and also of larger diameter than the tubular body element 6 of the sheath 4. The free terminal end of the core element 12 is formed into a hemisphere to assist in passage through the restricted end 10 of the sheath 4 as will be more fully set forth hereinafter. A groove 18 is formed on the core element 12 a predetermined distance from the base of the hemisphere of the terminal end 16. Between the groove 18 and the head 14 an expander element 20 having the configuration of a truncated cone is formed in abutting circumscribed relationship with its greater diameter base facing toward the under part of the head 14 and forming a shoulder 2 with the core element 12. The expander element 20 is usually formed closer to the head 14 than the terminal end 16. The smaller diameter of the expander element 20 has its width equal to the diameter of the core element 12.

To engage the assembly of the pin 2 and the sheath 4 to a pair of apertured supports the following steps are taken. A pair of supports 22 and 24 each having an inner wall 26 and 28 respectively forming an aperture through its respective support are placed so that the axes of the two apertures are coincident. The diameters of the apertures formed by the inner walls 26 and 28 are slightly greater than the external diameter of the tubular element 6 of the sheath 4. With the two supports in abutting relationship and the axes in the position mentioned hereinbefore, the sheath 4 is passed between the inner walls 26 and 28 until the collar 8 is in superposed abutting relationship with the upper surface of the upper supports. The head of the pin 2 is now passed into the tubular body element 6 and the head 14 having a greater diameter than the diameter of the restricted end of the sheath 4 forces it apart until the restricted end 10 snaps into the groove 18 as shown in FIG. 1. In this position the expander element 20 has not begun to effect the configuration of the tubular body element 6. As the axial force is continued on the head 14, the greater diameter of the shoulder 21 expands the wall of the tubular element 6 until the shoulder 21 reaches the point slightly below the lower surface of the support farthest from the head 14 at which time a bulge 30 is formed in the wall of the tubular body element 6 in abutting relationship with the lower surface of the support farthest from the head portion 14. At the same time the restricted end 10 has moved from the groove 18 to a point closer to the head 14 and in angular relationship to the axis of the pin 2 thereby increasing the holding engagement caused by the bulge 30 working with the head 14 when it is finally seated on the collar 8 in superposed abutting relationship. Obviously, the distance between the shoulder 21 and the undersurface of the head 14 is of some importance; and the closer this relation conforms to the thickness of the collar 8 and the two supports the tighter the engagement of all the elements in the total assembly.

Figure 3:
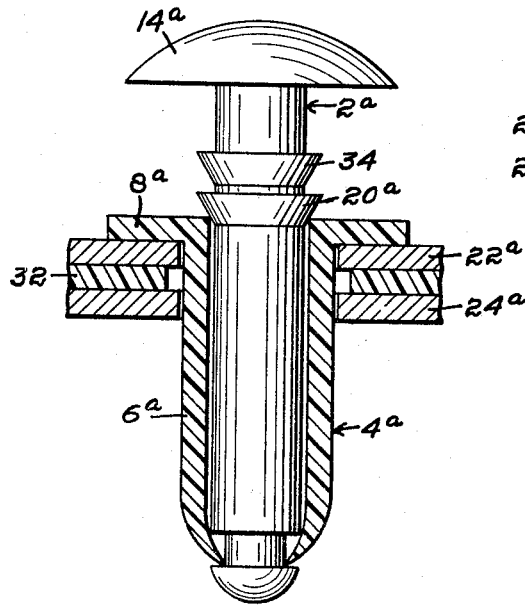
FIG. 3 is a figure similar to FIG. 1 showing a variation of the pin.
Figure 4:
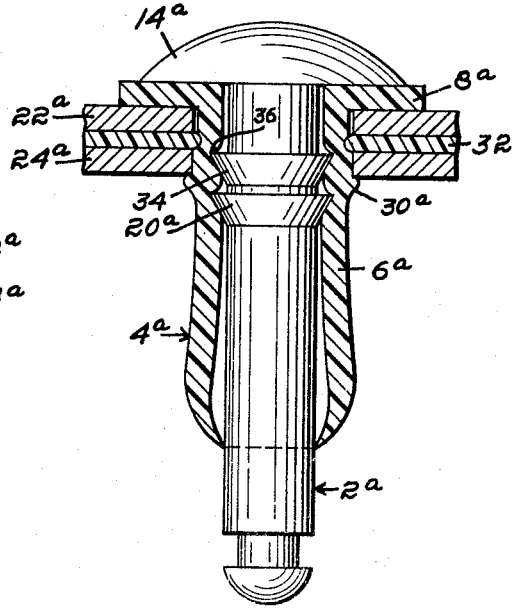
FIG. 4 shows the assembly disclosed in FIG. 3 fully engaged.

A variation of the embodiment disclosed in FIGS. 1 and 2 is shown in FIGS. 3 and 4. This particular variation is shown utilized with a pair of apertured supports 22a and 24a having sandwiched between them a third support 32 which is formed of a compressible material. The diameter of the aperture formed in the third support 32 is made larger than the apertures formed in either of the supports 22a or 24a. The additional diameter of the aperture formed in the third support 32 is taken up after engagement of the assembly with the support by the compression of the material and its extrusion into and against the body element 6a of the sheath 4a. The chief difference in the variation from the original is found in the pin 2a where a second expander element 34 having the same form as the expander element 20 of the original configuration creates an additional anchorage 36. The first expander element 20a is situated at a distance from the base of the head 14a equal to the sum of the thicknesses of the collar 8a and the three supports 22a, 24a and 32 and formed the bulge 30a. The utilization of the compressible material as the middle layer of the three layers of support allow the second bulge 36 to be formed easily. The utilization of the two spaced expander elements causes the inner wall to be indented, circumferentially on two planes spaced from each other, thereby approximately doubling the holding capacity of the fastener pin.

While there has been illustrated and described a preferred embodiment of the invention, it should be understood by those skilled in the art that the invention is best defined by the following claims.

I claim:

1. The combination of a fastening device and at least two apertured supports, said fastening device comprising a pin and a sheath, said pin having a cylindrical core element, a head formed in integral relationship with one end of said core element, the other terminal end having a means of engaging a portion of said sheath and having a groove formed adjacent thereto and at least one expander element having a diameter greater than said core element and formed a predetermined distance from said head and from said other terminal end and said sheath comprising a tubular body element formed of an elastically deformable material open at both ends and having a collar extending in integral right angle relationship adjacent one of said ends and having a diameter greater than the external diameter of said tubular body element and the other end having an opening of less diameter than the remaining internal diameter of said tubular body element to form a restricted end, each of said supports having an inner wall forming an aperture therethrough both of said inner walls circumscribing a portion of said tubular body element in close proximity to said collar and said collar in superposed abutting relationship to one of said supports adjacent said inner wall and said head in superposed abutting relationship with said collar and said expander element forming an external bulge in said tubular body element, said external bulge engaging the lower surface of the lower support and said restricted end in circumscribed relationship with said core element a predetermined distance from said neck.

2. The combination of a fastening device and at least three supports, said fastening device comprising a pin and a sheath, said pin having a cylindrical core element, a head formed in integral relationship with one end of said core element, the other terminal end having a means of engaging a portion of said sheath and having a groove formed adjacent thereto and at least two expander elements each having a diameter greater than said core element and each formed a predetermined distance from said head and each of said expander elements having a base portion forming a shoulder with said core element and said base portions being in spaced parallel relationship with each other and said sheath comprising a tubular body element formed of an elastically deformable material open at both ends and having a collar extending in integral right angle relationship adjacent one of said ends and having a diameter greater than the external diameter of said tubular body element and the other end having an opening of less diameter than the remaining internal diameter of said tubular body element to form a restricted end, each of said supports having an inner wall forming an aperture therethrough all of said inner walls circumscribing a portion of said tubular body element and said collar in superposed abutting relationship to one of said supports adjacent said inner wall and said head in superposed abutting relationship with said collar and the closer of said expander elements to said groove forming an external bulge in said tubular body element, said external bulge engaging the lower surface of the lower support and said restricted end in circumscribed relationship with said core element a predetermined distance from said neck and said supports including a support of compressible material sandwiched between the remaining two supports having an inner wall forming an aperture of greater diameter than the diameters of the other two apertures.

3. A fastener device comprising a pin element and a sleeve element, said sleeve element formed of a resilient material engaged with and circumscribing the major portion of said pin element prior to engagement with a support, said pin element having a core, said core being of substantially uniform diameter and having a pair of ends and an expander element in the form of a truncated cone in integral circumscribed relation with said core and having a diameter greater than said core and interposed between said ends, one of said ends having a head portion integral therewith, and the other end providing a free terminus and said expander element having its maximum diameter in closer proximity to said head portion than the remaining part of said expander element and said sleeve element including a tubular body portion having a wall continuous throughout its height, said body portion being open at both ends and of uniform external diameter for the major portion of its height, and one end of said body portion having a smaller diameter than the remaining portion of said body portion to provide a limiting element, said expander element distorting said body portion on a plane between said open ends on engagement with an apertured support.

References Cited in the file of this patent

UNITED STATES PATENTS

| | | |
|---|---|---|
| 2,088,955 | Hamill | Aug. 3, 1937 |
| 2,751,809 | Barker | June 26, 1956 |
| 2,876,485 | Cowles | Mar. 10, 1959 |
| 2,882,780 | Edwards | Apr. 21, 1959 |
| 3,053,046 | Fleming | Sept. 11, 1962 |
| 3,077,251 | Fraylick et al. | Feb. 12, 1963 |
| 3,099,931 | Ferdinand | Aug. 6, 1963 |

FOREIGN PATENTS

| | | |
|---|---|---|
| 520,169 | Great Britain | Oct. 3, 1939 |
| 821,902 | Great Britain | Oct. 14, 1959 |
| 1,222,697 | France | Jan. 25, 1960 |

UNITED STATES PATENT OFFICE
CERTIFICATE OF CORRECTION

Patent No. 3,147,525 September 8, 1964

Jean Pierre Texier

It is hereby certified that error appears in the above numbered patent requiring correction and that the said Letters Patent should read as corrected below.

In the heading to the sheet of drawing, line 2, and in the heading to the printed specification, line 2, title of invention, for "TWO-PIECE MOLDING FASTENER", each occurrence, read -- PIN FASTENER --.

Signed and sealed this 21st day of September 1965.

(SEAL)
Attest:

ERNEST W. SWIDER
Attesting Officer

EDWARD J. BRENNER
Commissioner of Patents